United States Patent
Lee et al.

(10) Patent No.: US 6,751,613 B1
(45) Date of Patent: Jun. 15, 2004

(54) MULTIMEDIA DATA KEYWORD MANAGEMENT METHOD AND KEYWORD DATA STRUCTURE

(75) Inventors: Jin Soo Lee, Seoul (KR); Hyeon Jun Kim, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 270 days.

(21) Appl. No.: 09/642,674

(22) Filed: Aug. 22, 2000

(30) Foreign Application Priority Data

Aug. 27, 1999 (KR) .................................. 1999-0035797

(51) Int. Cl.[7] .......................... G06F 17/30; G06F 7/00
(52) U.S. Cl. ............................................. 707/5; 707/10
(58) Field of Search .................................. 707/1–5, 10

(56) References Cited

U.S. PATENT DOCUMENTS

| | | | | |
|---|---|---|---|---|
| 5,020,019 A | * | 5/1991 | Ogawa ........................... | 707/5 |
| 5,168,565 A | * | 12/1992 | Morita ........................... | 707/3 |
| 5,297,042 A | * | 3/1994 | Morita ........................... | 707/5 |
| 5,696,964 A | * | 12/1997 | Cox et al. ...................... | 707/5 |
| 5,787,421 A | * | 7/1998 | Nomiyama ..................... | 707/5 |
| 5,819,259 A | * | 10/1998 | Duke-Moran et al. ......... | 707/5 |
| 6,314,420 B1 | * | 11/2001 | Lang et al. ..................... | 707/3 |
| 6,405,202 B1 | * | 6/2002 | Britton et al. .................. | 707/9 |
| 6,507,841 B2 | * | 1/2003 | Riverieulx de Varax ....... | 707/5 |
| 6,643,643 B1 | * | 11/2003 | Lee et al. ....................... | 707/5 |

OTHER PUBLICATIONS

Price, R., T–S Chua and S. Al–Hawamdeh "Applying Relevance Feedback to a Photo Archival System", Journal of Information Science, vol. 18, pp. 203–215, 1992.*

Zhu, L., Rao, A. and Zhang, A. "Theory of Keyblock–Based Image Retrieval", ACM Transactions on Information Systems, vol. 20, No. 2, pp. 224–257, Apr. 2002.*

Zhou, X.S. and Huang, T.S. "Comparing Discrimination Transformations and SVM for Learning During Multimedia Retrieval", Proceedings of the 9th ACM International Conference on Multimedia (<< '01), pp. 137–146, Sep. 30–Oct. 2, 2001.*

Yeh, C.H. and Kuo, C.J. "Index–Based Fast Search Algorithm of Image Database on Internet", Proceedings of the 2000 IEEE International Conference on Multimedia and Expo (ICME 2000), pp. 1195–1198, v.2, 2000.*

Yang, Z. and Kuo, C.–C. J., "Learning Image Similarities and Categories from Content Analysis and Relevance Feedback", Proceedings of the 2000 ACM International Multimedia Conference, pp. 175–178, Nov. 2000.*

Lim, J.–H. "Learnable Visual Keywords for Image Classification", Proceedings of the 4th ACM Conference on Digital Libraries, p 139–145, Aug. 1999.*

Meilhac, C. and Nastar, C. "Relevance Feedback and Category Search in Image Databases", Proceedings of the IEEE International Conference on Multimedia Computing and Machines, pp. 512–517, v.1, Jul. 1999.*

Bhanu, B., Qing, S. and Peng, J. "Learning Integrated Online Indexing for Image Databases", Proceedings of the 1998 International Conference on Image Processing (ICIP 98), pp. 789–793, v.2, Oct. 4–7, 1998.*

(List continued on next page.)

*Primary Examiner*—John Breene
*Assistant Examiner*—Luke S Wassum
(74) *Attorney, Agent, or Firm*—Fleshner & Kim, LLP

(57) ABSTRACT

A multimedia data keyword management method and a keyword data structure which can be applied to a search system is disclosed. According to the present invention, the search system includes a data table having a plurality of multimedia objects mapped with one or more keywords and can additionally register a new keyword to a data table through a feedback of a user according to a search result when a particular multimedia object is to be searched with a specific keyword. Each newly registered keyword can be weighted based on the keyword feedback authorization level of the user providing the feedback.

17 Claims, 3 Drawing Sheets

OTHER PUBLICATIONS

Bouet, M. and Djeraba, C. "Powerful Image Organization in Visual Retrieval Systems", Proceedings of the 6th ACM International Conference on Multimedia, pp. 315–322, Sep. 1998.*

Selberg, E. and Elzioni, O. "Experiments with Collaborative Index Enhancement", Technical Report UW–CSE–98–06–01, Department of Computer Science and Engineering, University of Washington, Jan. 28, 1997.*

Bartell, B.T. "Optimizing Ranking Functions: A Connectionist Approach to Adaptive Information Retrieval", PhD dissertation, University of California, San Diego, 1994.*

Price, R., Chua, T.–S. and Al–Hawamdeh, S. "Applying Relevance Feedback to a Photo Archival System", Journal of Information Science, vol. 18, pp. 203–215, 1992.*

Lewis, D.D. "Learning in Intelligent Information Retrieval", Proceedings of the 8th International Workshop on Machine Learning (ML 91), pp. 235–239, 1991.*

Kato, T. et al. "Cognitive View Mechanism for Multimedia Database System", Proceedings of the 1st International Workshop on Interoperability in Multidatabase Systems, pp. 179–186, Apr. 7–9, 1991.*

Belew, R.K. "Adaptive Information Retrieval: Using a Connectionist Representation to Retrieve and Learn about Documents", Proceedings of the 12th Annual Conference on Research and Development in Information Retrieval, pp. 11–20, 1989.*

Salton, G. "Automatic Text Processing: The Transformation, Analysis and Retrieval of Information by Computer", Reading:Addison–Wesley, pp. 313–373, 1989. QA76.9.T48S25 1989.*

Yang, C.S. "On Dynamic Document Space Modification Using Term Discrimination Values", in Information Storage And Retrieval Scientific Report No. ISR–22 to The National Science Foundation, pp. X–1 to X–28, Nov. 1974.*

Brauen, T.L. "Document Vector Modification", in "The SMART Retrieval System: Experiments in Automatic Document Processing", G. Salton, ed., Englewood Cliffs:Prentice Hall, pp. 456–484, 1971. Z699.4.S2 S3.*

* cited by examiner

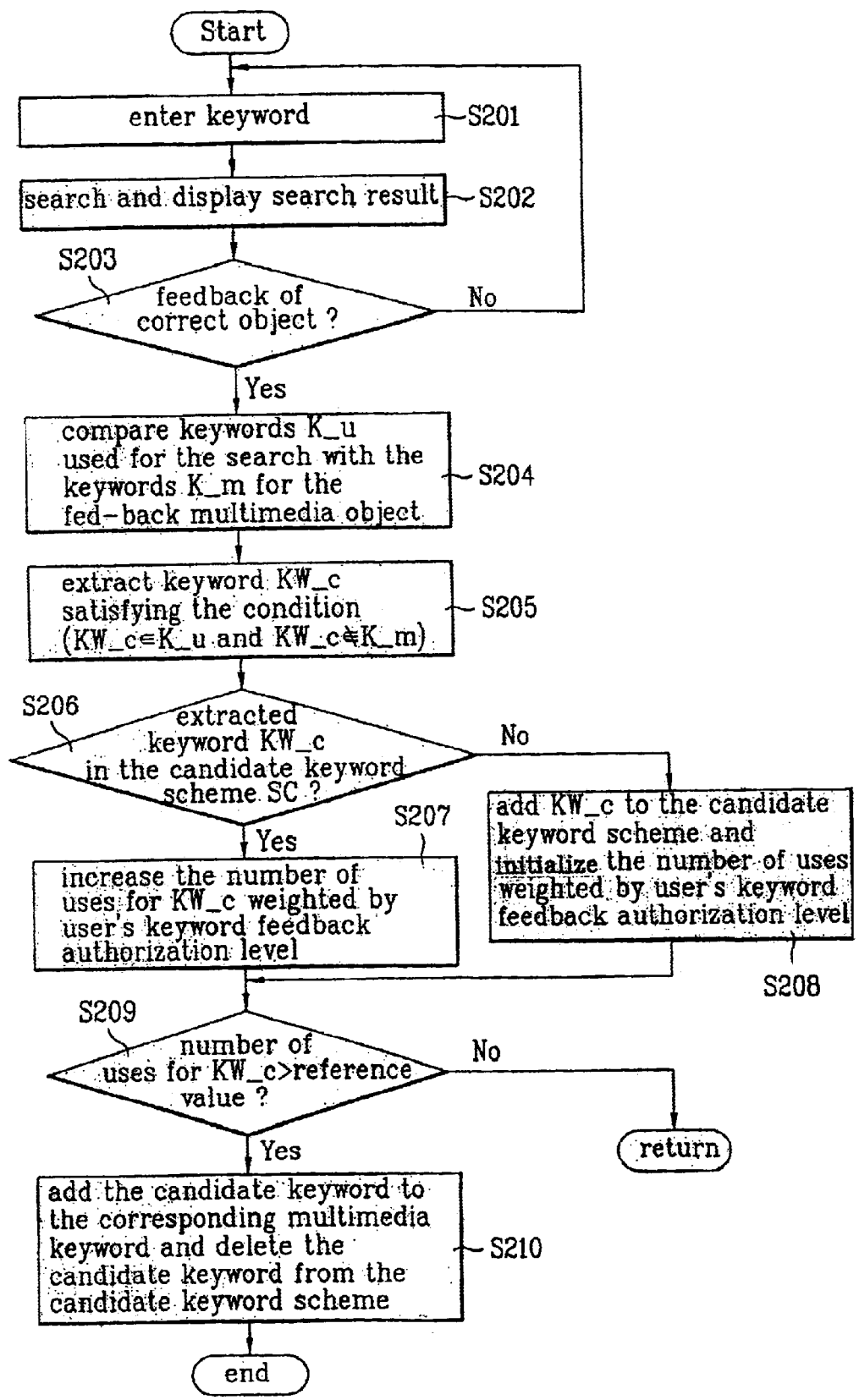

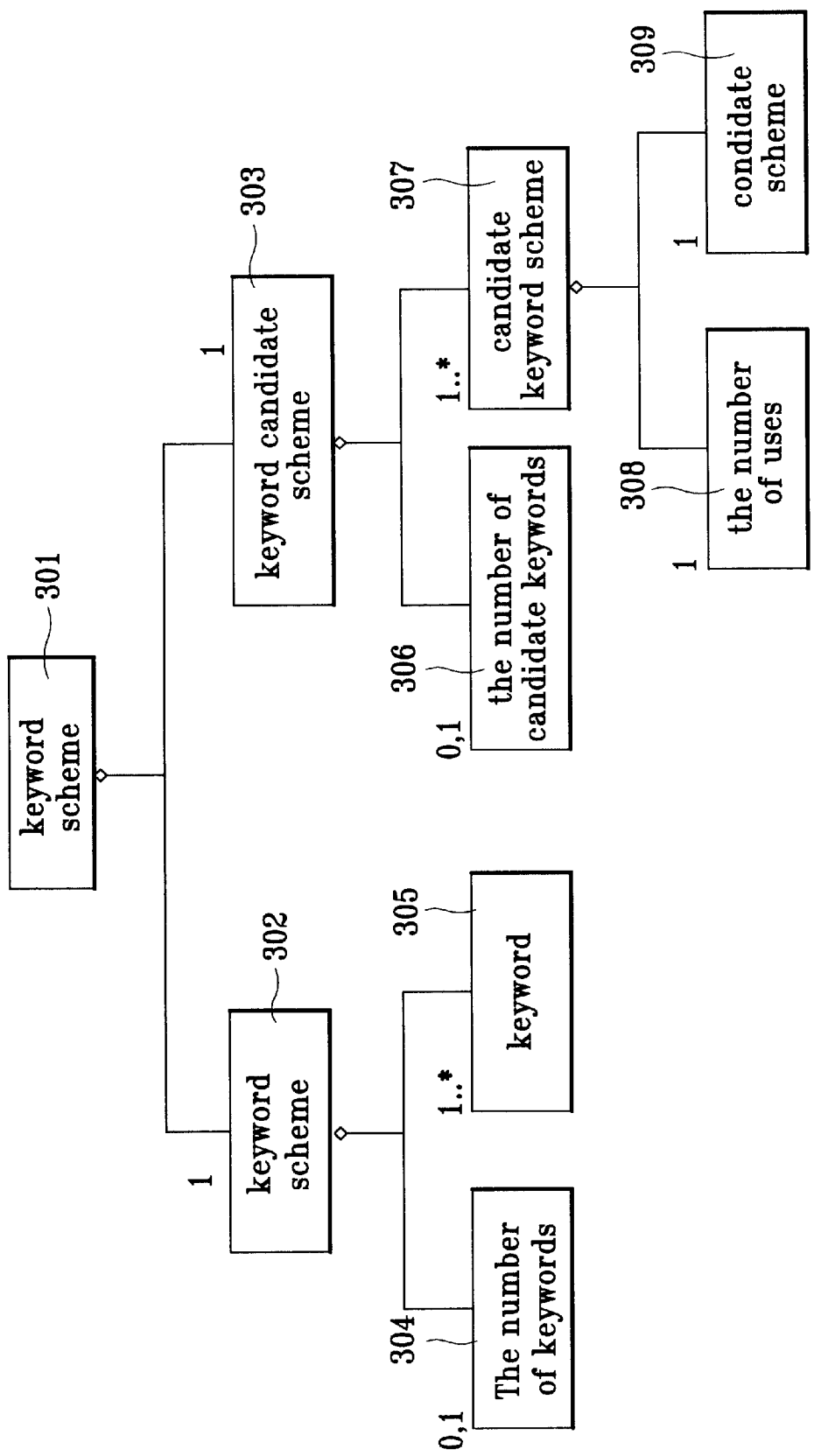

MULTIMEDIA DATA KEYWORD MANAGEMENT METHOD AND KEYWORD DATA STRUCTURE

BACKGROUND OF THE INVENTION

1. Field of the Invention

The present invention relates to a multimedia data keyword management method for multimedia objects, and more particularly to a multimedia data keyword management method and a keyword data structure which enable addition of new keywords to a search system by feedback from a user.

2. Description of the Related Art

Recently, the technology for digital image signal processing has significantly been developed and has been applied in various fields. One field in which the digital image signal processing technology may be used is a search system for searching a particular object in image files such as a document, a movie, or a drama. Regardless of the method of searching, all search system must perform a prompt and exact search of the particular object.

In a search system for searching a multimedia object using a keyword, an operator of the search system assigns a specific keyword to a multimedia data. Thus, an multimedia object which matches a keyword entered by a user is searched for and displayed. In such process, each keyword is pre-assigned either manually or automatically by an object producer provided in the search system.

However, when actually using a search system based on keywords, it may be difficult for a user to enter a keyword which exactly matches a desired multimedia object. For example, a particular object may be mapped with a keyword of "picture," while a user may try to search the object with a keyword of "image." Accordingly, the user may not obtain a satisfactory result.

To solve this problem, U.S. Pat. No. 5,020,019 discloses a object search system which includes a table having Information of associated keywords and which performs a search using these similar keywords to which weight values are assigned by the user. Also, various keyword search engines include a table having similar words, thereby allowing a search system to perform a search referring to the table when a user enters a keyword. For example, U.S. Pat. No. 5,297,042 discloses such a search system.

In still another search system, a keyword definition structure is implemented, in which a definition matched with each keyword is hierarchically displayed on a user profile and is controlled by a feedback from a user. However, the hierarchical structure change by feedback is possible only for keywords already defined, and cannot be used for other similar keywords which has not previously been defined. Therefore, a user cannot perform a satisfactory search.

Additionally, while the search systems in the related art may provide various search approaches from a user, the predetermined keyword information for an object cannot be changed by feedback from the user. Namely, search systems in the related art based on similar word table or hierarchical structure try to determine a correct meaning of a keyword entered by a user, but can only return objects matched with predefined keywords stored in the search system and cannot provide a search result if a keyword entered by a user is not among the predefined keywords. Moreover, since the search systems in the related art uses only one table of similar words in managing the total multimedia objects, they cannot reflect different search patterns of various users.

SUMMARY OF THE INVENTION

Accordingly, an object of the present invention is to solve at least the problems and disadvantages of the related art.

An object of the present invention is to provide a more efficient multimedia data keyword management method in a search system including a data table having a plurality of multimedia objects mapped with one or more keywords.

Another object of the present invention is to provide a multimedia data keyword management method which can additionally register a new keyword to a data table through a feedback of a user according to a search result.

Still another object of the present invention is to provide a keyword data structure for effectively performing multimedia object management in a multimedia object search system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a search system based on keyword comprises a user entering one or more keywords with respect to a plurality of multimedia objects stored in a search system; matching the keywords to a multimedia object management table controlled by the search system; searching and displaying a multimedia object matched with the keywords; the user verifying the displayed search result and feeding back one or more correct information to the search system by the user; and the search system determining whether the keywords used for the search are registered in a corresponding multimedia object management table and adding the keywords to the corresponding multimedia management table according to the determination result.

The search system further comprises determining the authorization class of the user who feeds back information when a keyword is added to the corresponding multimedia object management table; and allowing or restricting the addition of the keyword to the multimedia object management table depending on the authorization.

In another embodiment of the present invention, a multimedia search system based on keyword comprises a user generating one or more keywords with respect to a plurality of multimedia objects stored in a search system; matching the keywords with a multimedia object management table controlled by the search system; searching and displaying a multimedia object matched with the keywords; the user verifying the displayed search result and feeding back one or more correct information to the search system; the search system determining through the fed back information whether the keywords used for the search are registered in the corresponding multimedia object management table, and calculating the number of the feedbacks from the user with respect to the unregistered keywords; and the search system adding the unregistered keywords to the corresponding multimedia management table if the number exceeds a predetermined threshold value.

The calculation of the number of feedbacks further comprises determining whether a keyword is in a candidate keyword scheme of the search system, if the keyword used is not registered in the corresponding multimedia object management table; increasing the number of uses for the keyword if it is determined that the keyword is in the candidate keyword scheme; and adding a keyword to the candidate keyword scheme and initializing a number of uses, if it is determined that the keyword is not in the candidate keyword scheme.

A keyword data structure in a multimedia object search system according to the present invention comprises a used keyword scheme having keywords predefined by a multimedia object search system; and a candidate keyword scheme having candidate keywords obtained by a feedback from a user.

BRIEF DESCRIPTION OF THE DRAWINGS

The invention will be described in detail with reference to the following drawings in which like reference numerals refer to like elements wherein:

FIG. 2 is a flow chart of a process for adding a multimedia data keyword in accordance with a second embodiment of the present invention; and FIG. 3 shows a keyword data structure used for a keyword management in accordance with the present invention.

DESCRIPTION OF PREFERRED EMBODIMENT

Figure 1:
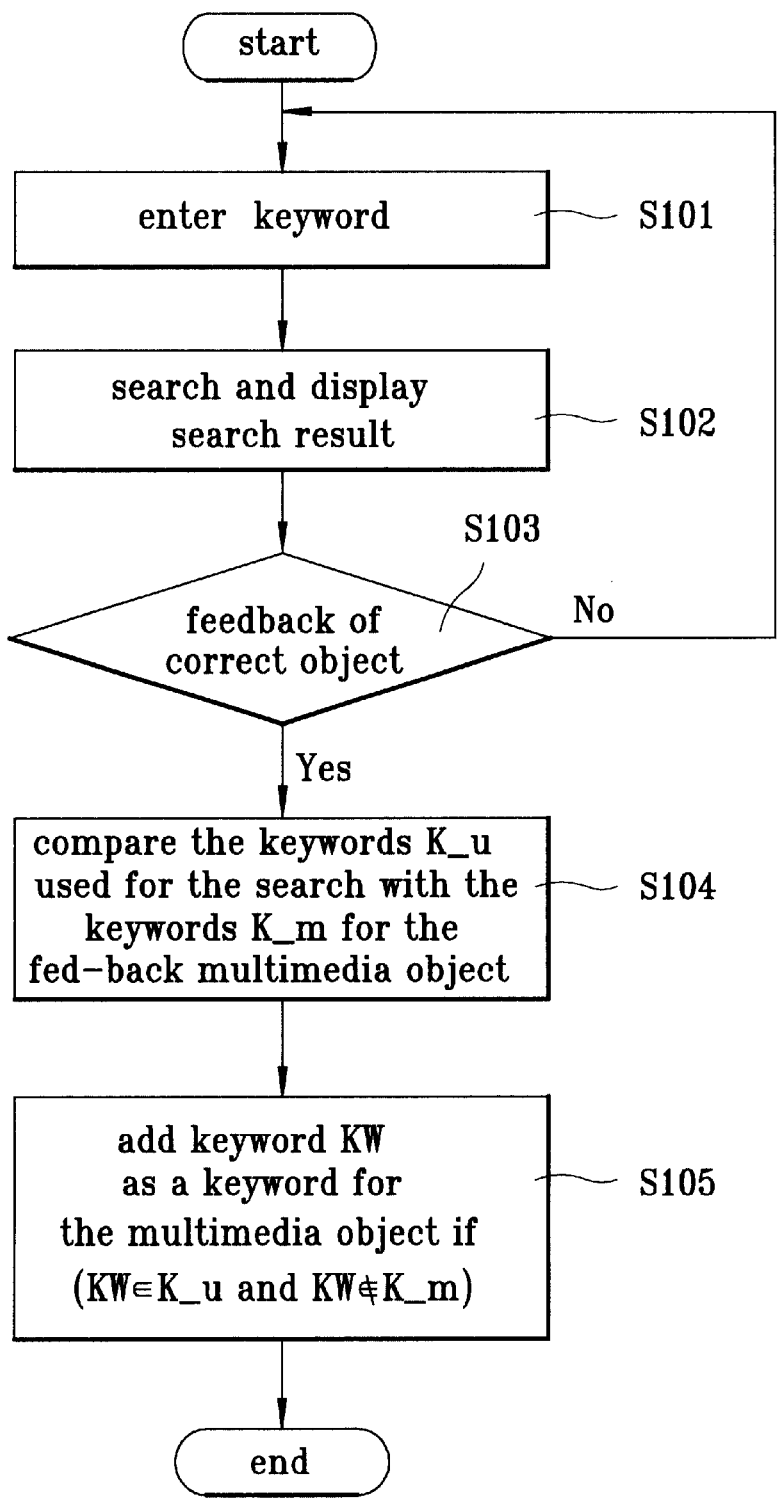
FIG. 1 is a flow chart of a process for adding a multimedia data keyword in accordance with a first embodiment of the present invention.

The present invention will now be described with reference to the illustrated embodiment.

Referring to FIG. 1, when a user enters a keyword in a search system (S101), the search system searches for a corresponding multimedia object mapped to the entered keyword and displays the search result (S102). If the displayed search result includes a multimedia object desired by the user, the user feeds back such information to the search system. Based upon the feedback, the keyword can be added to a corresponding multimedia object management table provided in the search system.

Particularly, during a search session of entering different keywords and viewing the different results corresponding to the different keywords, if a desired object is displayed, the user may give feedback to the search system that the searched multimedia object is correct. Accordingly, the search system determines during the search session whether a search results in a correct object (S103). If the search results in a correct object, the search system compares the keywords K_u used during the search session with the keywords K_m for the fed-back multimedia object (S104), wherein the multimedia keywords K_m have been already registered in the corresponding multimedia object management table.

If there exists a keyword KW satisfying equation 1 below, the keyword is additionally registered in the corresponding multimedia object management table (S105).

$$KW \in K\_u \text{ and } KW \notin K\_m \qquad [1]$$

Namely, if a keyword used during a search is not registered in the corresponding multimedia object management table, the keyword is newly registered in the corresponding multimedia object management table.

Also, in the above embodiment, the user is assumed to have the authority to add a new keyword to the search system. That is, the information fed back by the user is believed to be reliable. Thus, when a new keyword is fedback as a response to a search result, the keyword can be registered in a corresponding multimedia object. However, the search system may first check the authority of the user before adding a new keyword to the corresponding multimedia object. In such case, the search system may request for an authorization code or may automatically determine the authority allocated to a user through a user identification.

FIG. 2 is a process for search system in which a user cannot directly add a keyword.

As in the first embodiment, when a user enters a keyword in a search system (S201), the search system searches for a corresponding multimedia object mapped to the entered keyword and displays the search result (S202). If the displayed search result includes a multimedia object desired by the user, the user feeds back such information to the search system. Based upon the feedback, the keyword can be added to a corresponding multimedia object management table provided in the search system.

Namely, during a search session of entering different keywords and viewing the different results corresponding to the different keywords, if a desired object is displayed, the user may give feedback to the search system that the searched multimedia object is correct. Accordingly, the search system determines during the search session whether a search results in a correct object (S203). If the search results in a correct object, the search system compares the keywords K_u used during the search session with the keywords K_m for the fed-back multimedia object (S204), wherein the multimedia keywords K_m have been already registered in the corresponding multimedia object management table.

If there exists a keyword KW_c satisfying equation 1 below, the keyword is extracted (S205).

$$KW\_c \in K\_u \text{ and } KW\_c \notin K\_m \qquad [2]$$

Thereafter, if a keyword used during a search is not registered in the corresponding multimedia object management table, a determination is made whether the extracted keyword is in a candidate keyword scheme SC (S206). If an extracted keyword KW_c is in the candidate keyword scheme SC, the frequency or number of uses of the keyword KW_c is increased (S207). If an extracted keyword KW_c is not in the candidate keyword scheme SC, the keyword KW_c is added to the candidate keyword scheme SC and the frequency or number of uses is initialized (S208).

Here, the number of uses of a keyword KW_c in S207 may be increased in units of one, and the number of uses of a keyword KW_c in S208 may be initialized to either zero or one. Alternatively, weights may be assigned to increase or initialize the number of uses of a keyword KW_c, based upon a keyword feedback authorization level of the user. In such a case, the number of uses of a keyword KW_c may respectively be increased by or initialized to a value greater than one, depending on the weight assigned. Thus, the determination whether a candidate keyword is to be added to a corresponding multimedia object management table may depend on the keyword feedback authorization level of a user.

Thereafter, a determination is made whether the number of uses of a keyword KW_c in the candidate keyword scheme SC exceeds a threshold value (S209). If the number of uses of a Keyword KW_c exceeds the threshold value, the keyword KW_c is newly registered in the multimedia object management table and simultaneously, the keyword KW_c is deleted from the candidate keyword scheme SC (S210).

In the present invention, the feedback of a user may automatically be determined by a user's use of the search result. For example, a use by a user of a correct information contained in the search result would be the feedback on a search session. Here, the use means for example, a connection to a corresponding site when the search result is URL or a display of an image when the search result is moving images.

FIG. 3 shows a keyword data structure for the search system described in FIGS. 1 and 2.

Referring to FIG. 3, a keyword scheme 301 includes a keyword scheme 302 storing predefined keywords, and a keyword candidate scheme 303 storing candidate keywords obtained by a feedback from a user. The keyword scheme 302 includes the number of keywords 304 and an actual keyword list (or table) 305. Also, the candidate keyword scheme 303 includes the number of candidate keywords 306 and candidate keyword scheme 307. The candidate keyword scheme 307 includes the number of uses 308 for each candidate keywords, and a candidate keyword list (or table) 309.

Here, the number of keywords 304 and the number of candidate keywords 306 may be omitted to simply the structure.

As described above, according to the multimedia search system based on keyword management method and keyword data structure of the present invention, an object can be searched by keywords other than the keywords predefined in the search system Also, learning new keywords enables keywords for a particular object to be changed flexibly, thereby allowing a more efficient search by a user. Moreover, various habits of users are reflected by the feedback of a user. Accordingly, in a search of a multimedia object using a specific keyword, various user-oriented search environments can be provided.

It will be apparent to those skilled in the art that various modifications and variations can be made in a multimedia data keyword management method and a keyword data structure of the present invention without departing from the spirit or scope of the invention. Thus, it is intended that the present invention cover the modifications and variations of this invention provided they come within the scope of the appended claims and their equivalents.

What is claimed is:

1. A multimedia data keyword managing method comprising:
   receiving at least one keyword from a user of a plurality of allowed users;
   searching for and displaying at least one multimedia object mapped to said at least one keyword based upon multimedia object management tables of multimedia objects;
   comparing keywords K_u used for the search with keywords K_m registered in the multimedia object management table corresponding to the feedback multimedia object;
   determining whether there is at least one keyword KW in K_u but not in K_m;
   adding said at least one keyword to the multimedia object management table corresponding to a feedback multimedia object, if at least one multimedia object displayed is fed back by the user,
   wherein adding said at least one keyword to the multimedia object management table comprises:
      determining a keyword feedback authorization level of the user; and
      adding said at least one keyword to the multimedia object management table corresponding to the feedback multimedia object, if the keyword feedback authorization level of the user exceeds a predetermined level.

2. The method of claim 1, wherein adding said at least one keyword to the multimedia object management table comprises:
   determining whether said at least one keyword KW is in a candidate keyword scheme;
   increasing a number of uses of said at least one keyword KW by a first predetermined value if said at least one keyword KW is in the candidate keyword scheme;
   adding said at least one keyword KW to the candidate keyword scheme and initializing the number of uses of said at least one keyword KW to a second predetermined value, if said at least one keyword KW is not in the candidate keyword scheme;
   determining whether the number of uses of a keyword KW_c in the candidate keyword scheme exceeds a predetermined threshold value; and
   adding said keyword KW_c in the multimedia object management table corresponding to the feedback multimedia object, if the number of uses of said keyword KW_c exceeds the predetermined threshold value.

3. A method of claim 2, further comprising deleting said keyword KW_c from the candidate keyword scheme.

4. A method of claim 2, wherein in increasing the number of uses, said first predetermined value varies based upon the keyword feedback authorization level of the user.

5. A method of claim 2, wherein said second predetermined value is one of either zero or one.

6. A method of claim 2, wherein said second predetermined value varies based upon the keyword feedback authorization level of the user.

7. A method of claim 1, wherein a multimedia object displayed is fed back as the feedback multimedia object if the user either directly inputs a multimedia object displayed or uses a multimedia object displayed.

8. The method of claim 1, wherein the keyword KW is not a property of the at least one multimedia object.

9. A multimedia data keyword managing method comprising:
   generating and storing a plurality of multimedia objects with corresponding multimedia object management tables in a search system, wherein each of the multimedia object management tables includes one or both predefined keywords and feedback keywords mapped to a corresponding multimedia object;
   receiving at least one input keyword from a user;
   searching for and displaying at least one multimedia object mapped to said at least one input keyword based upon multimedia object management tables of multimedia objects stored in the search system;
   adding said at least one input keyword as a feedback keyword to a multimedia object management table corresponding to a feedback multimedia object, if at least one multimedia object displayed in is fed back by the user;
   wherein adding said at least one input keyword as a feedback keyword to a multimedia object management table comprises:
      determining whether said at least one input keyword is registered in the multimedia object management table corresponding to the feedback multimedia object;
      adding said at least one input keyword to the multimedia object management table corresponding to the feedback multimedia object, if said at least one input keyword is not registered in the multimedia object management table corresponding to the feedback multimedia object;

wherein adding said at least one input keyword to the multimedia object management table, if said at least one input keyword is not registered in the multimedia object management table comprises:

determining whether said at least one input keyword is in a candidate keyword scheme, if said at least one input keyword is not registered in the multimedia object management table corresponding to the feedback multimedia object;

increasing a number of uses of an input keyword KW by a first predetermined value, if said input keyword KW is in the candidate keyword scheme and otherwise, adding said input keyword KW to the candidate keyword scheme and initializing the number of uses of said input keyword KW to a second predetermined value;

determining whether the number of uses of a keyword KW_c in the candidate keyword scheme exceeds a predetermined threshold value; and adding said keyword KW_c in the multimedia object management table corresponding to the feedback multimedia object, if the number of uses of said keyword KW_c exceeds the predetermined threshold value, wherein said first predetermined value varies based upon a keyword feedback authorization level of the user, wherein the user is included in a plurality of verified users, and wherein each of the verified users has at least one of a plurality of different keyword feedback authorization levels.

10. A method of claim 9, wherein a multimedia object management table has a keyword data structure:

a keyword scheme having keywords predefined by a multimedia object search system; and a keyword candidate scheme having candidate keywords obtained by a feedback from verified users.

11. The method of claim 9, wherein the second predetermined value varies based on the keyword feedback authorization level of the user.

12. The method of claim 9, wherein the keywords are not properties of the at least one multimedia object.

13. A method for generating multimedia object management tables in a multimedia object search system, comprising:

incorporating a keyword scheme having keywords predefined by a multimedia object search system; and incorporating a keyword candidate scheme having candidate keywords obtained by a feedback from a verified user, wherein the keyword scheme comprises one of either a keyword list or table, and the keyword candidate scheme comprises candidate keywords and number of uses for each of said candidate keywords and wherein an amount the number of uses varies based upon a keyword feedback authorization level of the verified user, and wherein the verified user is among a plurality of verified users.

14. The method of claim 13, wherein the keyword scheme further comprises a current number of keywords.

15. The method of claim 13, wherein the candidate keyword scheme further comprises a current number of candidate keywords.

16. The method of claim 13, wherein a number of uses for a candidate keyword is included in each candidate keyword.

17. A multimedia data keyword managing apparatus, comprising:

means for receiving at least one keyword from a user;

means for searching for and displaying at least one multimedia object mapped to said at least one keyword based upon multimedia object management tables of multimedia objects;

means for comparing keywords K_u used for the search with keywords K_m registered in the multimedia object management table corresponding to the feedback multimedia object;

means for determining whether there is at least one keyword KW in K_u but not in K_m;

means for adding said at least one keyword to the multimedia object management table corresponding to a feedback multimedia object, if at least one multimedia object displayed is fed back by the user;

means for determining whether said at least one keyword KW is in a candidate keyword scheme;

means for increasing a number of uses of said at least one keyword KW by a first predetermined value if said at least one keyword KW is in the candidate keyword scheme;

means for adding said at least one keyword KW to the candidate keyword scheme and initializing the number of uses of said at least one keyword KW to a second predetermined value, if said at least one keyword KW is not in the candidate keyword scheme;

means for determining whether the number of uses of a keyword KW_c in the candidate keyword scheme exceeds a predetermined threshold value; and means for adding said keyword KW_c in the multimedia object management table corresponding to the feed back multimedia object, if the number of uses of said keyword KW_c exceeds the predetermined threshold value, wherein in increasing the number of uses, said first predetermined value varies based upon keyword feedback authorization level of the user.

* * * * *